June 6, 1933.　　　　E. MOWRY　　　　1,913,036

GANG ADJUSTING MEANS FOR DISK HARROWS

Filed Oct. 31, 1932　　2 Sheets-Sheet 1

Inventor
Edward Mowry.
By ... Atty.

June 6, 1933.  E. MOWRY  1,913,036
GANG ADJUSTING MEANS FOR DISK HARROWS
Filed Oct. 31, 1932    2 Sheets-Sheet 2

Inventor
Edward Mowry
By H. P. Doolittle
Atty

Patented June 6, 1933

1,913,036

UNITED STATES PATENT OFFICE

EDWARD MOWRY, OF ROCK FALLS, ILLINOIS, ASSIGNOR TO INTERNATIONAL HARVESTER COMPANY, A CORPORATION OF NEW JERSEY

GANG ADJUSTING MEANS FOR DISK HARROWS

Application filed October 31, 1932. Serial No. 640,455.

This invention relates to disk harrows. More particularly it relates to disk angling means.

The principal object of the invention is to provide in a disk harrow, disk angling means which may be manually operated or readily converted for draft power operation.

Another object is to provide a simple actuating mechanism and a readily adjustable means for shifting the mechanism for manual or power operation.

These objects, and others which will be apparent from the detailed description to follow, are accomplished by a construction such as shown in the drawings, in which.

Figure 1:
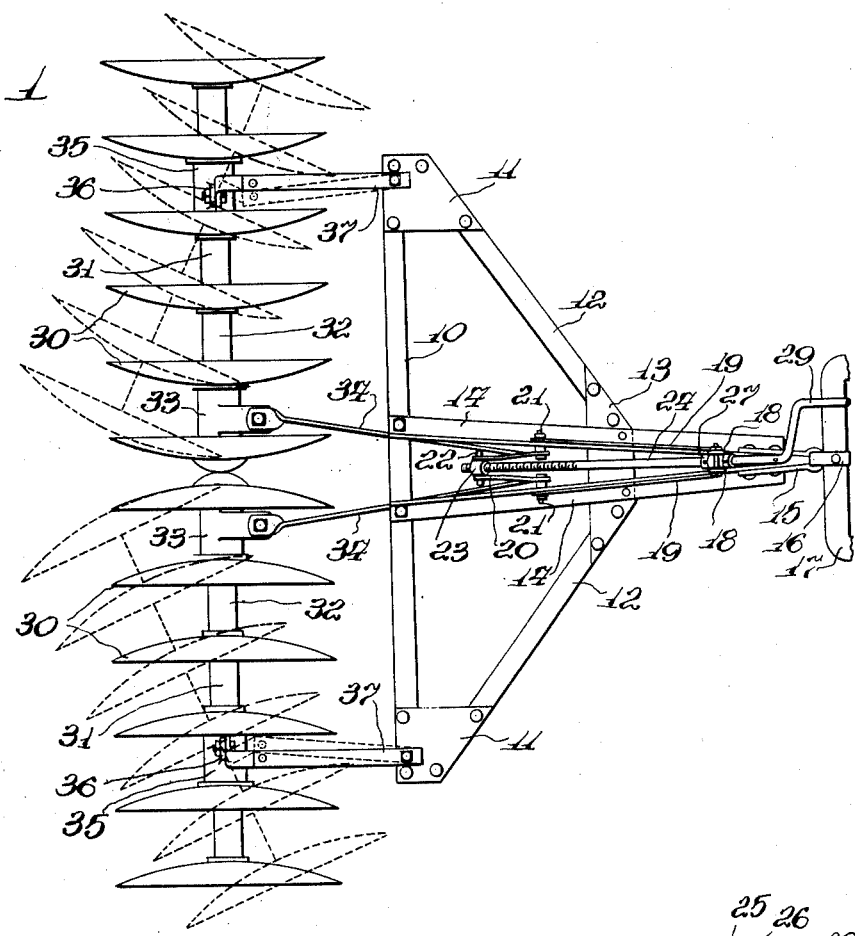
Figure 1 is a plan view of a disk harrow provided with the angling means of the invention, the disk gangs being shown arranged transversely in full lines and arranged in angle position in dotted lines.
Figure 2:
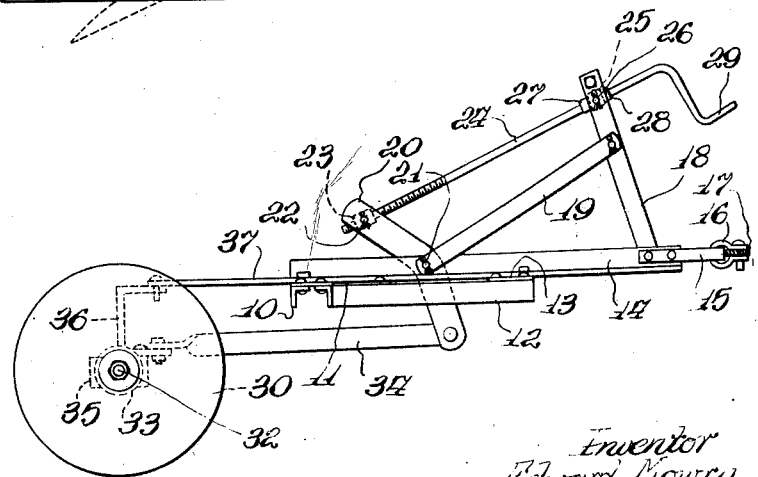
Figure 2 is an end elevation of the disk harrow shown in Figure 1, with the angling mechanism set for manual operation and with the disk gangs in straight across position.
Figure 3:
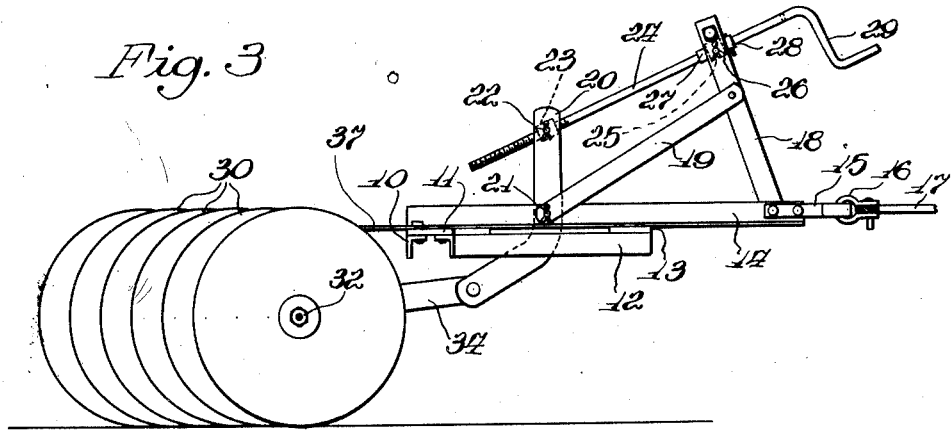
Figure 3 is an end elevation with the angling mechanism set for hand operation and with the disk gangs in angled position.

The draft frame of the disk harrow illustrated is built up of angle bars which form lateral forward and upward extensions. A transverse rear bar 10 is connected by gusset plates 11 with forwardly and inwardly extending bars 12. Said bars are connected by a transverse plate 13. Spaced forwardly converging bars 14 are positioned centrally of the bar 10 and connected thereto. The bars 14 are also secured to the plate 13 and at their forward ends to a V-shaped connecting member 15. A clevis 16, hooked into the member 15, is used for connecting the disk harrow to a draft means such as the drawbar 17 of a tractor, as illustrated. Spaced upwardly and rearwardly extending bars 18 are connected to the forward ends of the bars 14. Brace bars 19 are secured to said bars near their upper ends and to rearward locations on the bars 14 to hold the bars 18 rigidly in position. A pair of members 20, having portions extending above and below the horizontal plane of the draft frame, are pivoted intermediate their ends on the bars 14 by pins 21. The upper ends of said bars are arranged closely adjacent each other and are provided with aligned openings through which the trunnions 22 of a member 23 extend. Said member is, therefore, freely pivoted on a transverse axis between the members 20. At right angles to its axis the member is provided with a threaded bore through which the threaded end of the adjusting rod 24 extends. Said rod extends forwardly and upwardly through a bore formed in a member 25, which is similar in construction to the member 23. Trunnions 26, formed on the member 25, rotatably extend through transversely aligned openings formed in the upper ends of the bars 18. The adjusting rod 24 is freely rotatable and slidable in the bore formed in the member 25. A stop 27 in the form of a collar, is rigidly secured to the rod 24 below the member 25. Said stop is so positioned, as shown in Figure 2, that it will abut the member 25 when the disk gangs are in straight across position and when the threaded member 23 is at the lower end of the threads formed on the rod 24. A second stop 28, consisting of an annular collar, is mounted on the rod 24 above the member 25. Said stop is adjustable, as shown by a comparison of Figures 3 and 5, to two positions. In one position it abuts the upper side of the member 25 when the stop 27 is in engagement with the other side of the member. This position is shown in Figures 2 and 3. The rod 24 is then held against longitudinal movement in its upper support, formed by the member 25. A crank 29 is formed on the upper end of the rod 24. It will be understood that by operation of this crank to rotate the rod 24 the gangs may be angled from straight across position, as shown in Figure 2, to angled position, as shown in Figure 3. During this manual operation the two stops are arranged close together, adjacent the member 25, as above described.

Figure 4:
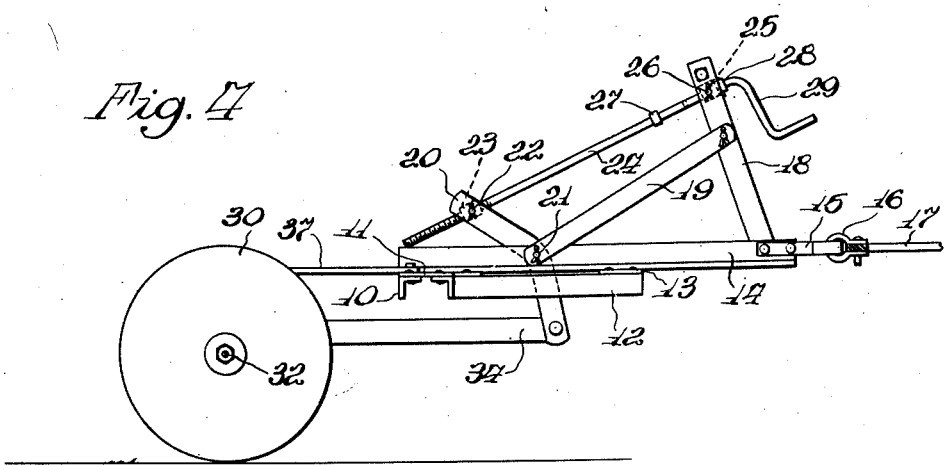
Figure 4 is an end elevation of the disk harrow with the angling mechanism set for power operation and with the disk gangs in straight across position.
Figure 5:
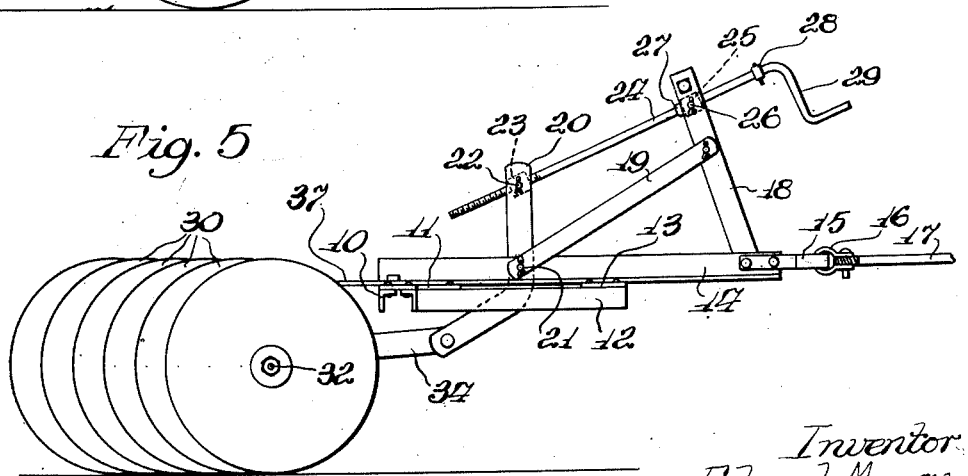
Figure 5 shows the same construction as Figure 4, with the disk gangs in angled position.

Figures 4 and 5 show the stop 28 in spaced position with respect to the stop 27. This arrangement is for power angling of the disk gangs. It will be noted that the rod 24 is threaded through the lower member. When the disk gangs are in straight across position, as shown in Figure 4, the upper stop 28 abuts the upper side of the member 25, the lower stop 27 being spaced below said member. For power angling, that is, for angling the disk by draft power applied to the drawbar or other draft mear the drag on the inner ends of the disks pulls the lower ends of the pivoted members 20 rearwardly and pushes their upper ends forwardly to the position shown in Figure 5. The rod 24 is pushed upwardly through the member 25, which serves as a support and a guide until the stop 27 abuts said member. This describes the operation of the linkage mounted on the draft frame.

The disk gangs are of the frameless construction, that is, there is no complete frame on which the gangs are supported. Each gang consists of a plurality of equally spaced disks 30 which are held apart by spacing spools 31. A shaft 32 secures the entire assembly together permanently in position. Between the first two disks at the adjacent ends of the gangs a journal member 33 is rotatably mounted around the spacing spools. Links 34 are pivotally connected to forwardly extending ears formed on the journals 33. At their forward ends the links 34 are pivotally connected to the downwardly extending ends of the members 20. Journals 35 are rotatably mounted on one of the spacing spools adjacent the outer ends of the disk gangs. As shown in dotted lines in Figure 2, an upwardly extending support 36 is rigidly connected to each of said journal members. A bar 37 pivotally connects said support with the ends of the draft frame. Said connections are formed by vertical pins extending through the ends of the bars 37 and through the plates 11.

The operation of the disk gang as above described, will be understood from the explanation of the operation of the actuating mechanism. The invention resides in the construction of the actuating mechanism by which the disk gangs may be angled manually or by draft power with the re-positioning of the stop 28.

It is to be understood that applicant has shown and described only a preferred embodiment of his improved convertible disk angling means and that he claims as his invention all modifications falling within the scope of the appended claims.

What is claimed is:

1. A disk harrow comprising a draft frame, a pair of disk gangs positioned end to end transversely of the draft frame and pivotally connected thereto, an angling linkage connected to the adjacent ends of the gangs and pivotally connected to the draft frame, means mounted on the draft frame and connected to said linkage for angling the gangs by application of tractive power to the draft frame and for angling by manual operation, said means including a member connected to the linkage, said member being mounted for movement relative to the linkage by manual operation and for movement relative to the frame by the application of tractive power to the draft frame.

2. A disk harrow comprising a draft frame, a pair of disk gangs positioned end to end transversely of the frame and pivotally connected thereto, an angling linkage mounted on the draft frame and connected to the adjacent ends of said gangs, an angling member connected at one end to said linkage and rotatably mounted on the draft frame, adjustable means for holding said member against movement in a longitudinal direction with respect to the draft frame, and manually adjusting means for altering the longitudinal position of said member relative to its connection with the angling linkage whereby the disk gangs may be manually angled, said adjustable means in another position of adjustment permitting longitudinal sliding movement of the member relative to the frame whereby the gangs may be angled by application of tractive power to the draft frame.

3. A disk harrow comprising a draft frame, a pair of disk gangs positioned end to end transversely of the frame and pivotally connected thereto, an angling linkage mounted on the draft frame and connected to the adjacent ends of said gangs, an angling member connected at one end to said linkage and rotatably mounted on the draft frame, adjustable means permitting in one position for longitudinal movement of the member with respect to the frame for power angling and in another position of adjustment holding said member against movement in a longitudinal direction with respect to the draft frame and manually adjusting means for altering the longitudinal position of said member relative to its connection with the angling linkage whereby the disk gangs may be manually angled.

4. A disk harrow comprising a draft frame, a pair of disk gangs positioned end to end transversely of the draft frame and pivotally connected thereto, an angling linkage connected to the adjacent ends of the gangs and pivotally connected to the draft frame, means mounted on the draft frame and connected to said linkage for angling the gangs by application of power to the draft frame and for angling by manual operation, said means including a member connected by a threaded portion with said linkage and rotatably supported on the frame, and means to hold said member against sliding movement with respect to the frame whereby the position of the angling linkage may be altered by rotation of the threaded portion of the member, said means being adjustable to permit sliding movement of the member with respect to the frame whereby the gangs may be angled by the application of tractive power to the draft frame.

5. A disk harrow comprising a draft frame, a pair of disk gangs positioned end to end at the rear of the draft frame and pivotally connected thereto, an angling linkage pivoted on the draft frame, an angling link connected to each gang and to said linkage, a threaded member pivoted on said linkage, a similar member having a plain bore formed therein pivotally mounted on the frame, an adjusting rod slidably extending through said member and threaded into the other member, a stop rigidly secured to the rod at one side of the member having a plain bore and a stop adjustably secured to the rod at the other side of said member, and means for rotating the rod for manual adjustment of the disk gang when the stops are positioned close together adjacent said member, power adjustment being accomplished by sliding action of the rod with the stops in spaced apart positions.

6. A disk harrow comprising a draft frame, a pair of disk gangs positioned end to end at the rear of the draft frame and pivotally connected thereto, an angling linkage pivoted on the draft frame, an angling link connected to each gang and to said linkage, a threaded member pivoted on said linkage, a similar member having a plain bore formed therein pivotally mounted on the frame, an adjusting rod slidably extending through said member and threaded into the other member, a stop rigidly secured to the rod on one side of the member having a plain bore and a stop adjustably secured to the rod on the other side of said member, and means for rotating the rod for manual adjustment of the disk gang, power adjustment being accomplished by sliding action of the rod with the stops in spaced apart positions.

7. A disk harrow comprising a draft frame having laterally forward and upward extensions, a pair of disk gangs positioned end to end at the rear of the draft frame and pivotally connected thereto on vertical axes spaced laterally beyond the centers of the gangs, an angling link connected to each gang, a linkage pivoted on the draft frame and extending above and below said frame, said angling links being pivotally connected to the downwardly extending portion of said linkage, a threaded member pivoted to the upwardly extending portion of said linkage, a similar member having a plain bore formed therein pivoted on the upwardly extending portion of the frame, an adjusting rod slidably extending through the upper member and threaded into the lower member, a stop rigidly secured to the rod below the upper member and a stop adjustably secured to the rod above the upper member, and a crank on said rod for manual adjustment.

In testimony whereof I affix my signature.

EDWARD MOWRY.